(12) United States Patent
Hsiao et al.

(10) Patent No.: US 7,724,332 B2
(45) Date of Patent: *May 25, 2010

(54) TRANSFLECTIVE LIQUID CRYSTAL DISPLAY DEVICES AND FABRICATION METHODS COMPRISING FIRST AND SECOND ALIGNMENT LAYERS ON A FIRST SUBSTRATE, WHEREIN PRE-TILT ANGLES AND ORIENTATIONS OF LIQUID CRYSTAL MOLECULES ON THE FIRST AND SECOND ALIGNMENT LAYERS ARE DIFFERENT

(75) Inventors: Chih-Chun Hsiao, Kaohsiung (TW); Ku-Hsien Chang, Kaohsiung (TW); Ru-De Chen, Taichung County (TW); Cheng-Hsi Hsieh, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 636 days.

This patent is subject to a terminal disclaimer.

(21) Appl. No.: 11/495,117

(22) Filed: Jul. 28, 2006

(65) Prior Publication Data
US 2007/0182900 A1 Aug. 9, 2007

(30) Foreign Application Priority Data
Feb. 6, 2006 (TW) ............................... 95103896 A

(51) Int. Cl.
*G02F 1/1337* (2006.01)
*G02F 1/1335* (2006.01)
*G02F 1/13* (2006.01)
(52) U.S. Cl. ................... 349/129; 349/114; 349/123; 349/187
(58) Field of Classification Search ................. 349/114, 349/129
See application file for complete search history.

(56) References Cited

U.S. PATENT DOCUMENTS

| 6,862,058 B2 | 3/2005 | Ikeno et al. |
| 6,900,863 B2 * | 5/2005 | Okamoto et al. ............. 349/114 |
| 6,912,038 B2 * | 6/2005 | Liao et al. .................... 349/187 |
| 7,250,996 B2 * | 7/2007 | Yoshida et al. ............... 349/114 |
| 2004/0145691 A1 * | 7/2004 | Kubota et al. ................ 349/114 |
| 2005/0122452 A1 | 6/2005 | Yoshida et al. |

FOREIGN PATENT DOCUMENTS

| TW | 574514 | 2/2004 |
| TW | 200401916 A | 2/2004 |
| TW | 581920 | 4/2004 |
| TW | 200408657 | 6/2004 |

* cited by examiner

*Primary Examiner*—Andrew Schechter
*Assistant Examiner*—Paisley L Arendt
(74) *Attorney, Agent, or Firm*—Quintero Law Office

(57) ABSTRACT

Transflective liquid crystal display devices and fabrication methods thereof. A single cell gap transflective liquid crystal display device includes a first substrate with a reflective region and a transmissive region. A second substrate opposes the first substrate. A liquid crystal layer is disposed between the first and second substrates. A reflective structure is disposed on the first substrate, thereby forming a recess at the transmissive region. A first alignment layer is conformably formed on the first substrate covering the reflective structure, thereby forming a second recess at the reflective region. The second recess is filled with a second alignment, wherein the first and second alignment layers provide different orientations and pre-tilt angles for the liquid crystal layer.

25 Claims, 6 Drawing Sheets

1

TRANSFLECTIVE LIQUID CRYSTAL DISPLAY DEVICES AND FABRICATION METHODS COMPRISING FIRST AND SECOND ALIGNMENT LAYERS ON A FIRST SUBSTRATE, WHEREIN PRE-TILT ANGLES AND ORIENTATIONS OF LIQUID CRYSTAL MOLECULES ON THE FIRST AND SECOND ALIGNMENT LAYERS ARE DIFFERENT

BACKGROUND OF THE INVENTION

1. Field of the Invention

The invention relates to liquid crystal display (LCD) devices, and in particular to reflective LCD devices and fabrication methods thereof 2. Description of the Related Art Liquid crystal display (LCD) devices have many advantages such as small volume, light weight and low power consumption, and are applicable in a variety of electronic and communication devices including notebook computers, personal digital assistants (PDA), mobile phones and the like due to lighter weight, thinner profile, and increased portability.

A conventional LCD device includes a pair of substrates with opposing electrodes thereon. A liquid crystal layer is interposed between the pair of substrates. An electric field is applied on the opposing electrodes to control liquid crystal molecular orientations in the liquid crystal layer, thereby displaying desirable images. Two alignment layers are separately interposed between the interfaces between the liquid crystal layer and each substrate, providing initial orientations and pre-tilt status for the molecules in the liquid crystal layer.

Conventional transflective LCD devices can take advantage of the ambient light and back light to display better quality of images. The transmissive mode can enhance the reflective mode in dark environments to improve brightness. The reflective mode can enhance the transmissive mode in bright environments for power conservation as well as overcoming the washout effect. The distance of light travel of the reflective region is twice as long as the distance of light travel of the transmissive region; however, the cell gap in the reflective region must differ from the cell gap in the transmissive region, resulting in deteriorating LCD performance, such as variations in brightness and color.

U.S. Pat. No. 6,862,058, the entirety of which is hereby incorporated by reference discloses a single gap transflective LCD device. In each pixel, different alignments layer are formed on the reflective region and the transmissive region respectively to reach the same phase retardation. A vertical alignment layer is formed on an active matrix substrate. A mask layer is disposed on the reflective region, thereby exposing the transmissive region under UV radiation. The vertical alignment on the transmissive region is transferred to a horizontal alignment layer. The mask layer is then removed. A rubbing procedure is performed on the vertical alignment layer on the reflective region, while a horizontal alignment layer is left on the transmissive region.

FIG. 1 is a cross section of a conventional transflective LCD device with different alignment layers on the reflective and the transmissive regions respectively. Referring to FIG. 1, a conventional transflective LCD device includes a lower substrate 11 such as an active matrix substrate and an upper substrate 21 such as a glass substrate with a color filter substrate 22 thereon. A liquid crystal layer 30 is interposed between the first substrate 11 and the second substrate 21. The transflective LCD device can be divided into a plurality of pixel regions. Each pixel region comprises a reflective region R and a transmissive region T. A transparent electrode 14 is formed on the lower substrate 11. A planarization layer 13 isolates the transparent electrode 14 from the lower substrate 11. The transparent electrode 14 electrically connects thin film transistors 12 from the lower substrate 11 via a contact hole 18. A reflector 15 is formed on the reflective region R of the transparent electrode 14. A vertical alignment layer 17 and a horizontal alignment layer 16 are respectively formed on the reflective region R and the transmissive region T of the lower substrate 11. A common electrode 23 is disposed on the color filter 22. A horizontal alignment layer 24 is formed on the common electrode 23. Different alignments are provided with respect to the reflective region R and the transmissive region T of the transflective LCD devices.

Forming different alignment layers on the reflective region R and the transmissive region T respectively, however, requires intricate lithography processes. For example, a polyimide (PI) alignment layer is selectively exposed on specific regions to induce photochemical reaction. The exposed regions of the PI alignment layer transits from vertical alignment to horizontal alignment, thereby achieving multi-domain alignments with different pre-tilt-angles. The conventional method requires the tedious addition of photo-catalyst in PI alignment layer and photo mask procedures, causing high production cost and low yield. It is desirable to overcome these and other problems of the prior art and to provide transflective LCD devices including T and R regions with different alignments that provide both regions with high light modulation efficiency.

BRIEF SUMMARY OF THE INVENTION

A detailed description is given in the following embodiments with reference to the accompanying drawings.

Accordingly, a transflective liquid crystal display device with a reflector structure is provided. A step is created between a transmissive region and a reflective region, causing a recess formed on the transmissive region. Different alignment layers, separately formed on the transmissive and reflective regions, provide both regions with balanced brightness and contrast ratio.

According to an embodiment of the invention, a transflective liquid crystal display device is provided. The transflective LCD device comprises: a first substrate with a reflective region and a transmissive region, a second substrate opposing the first substrate, a liquid crystal layer interposed between the first and the second substrates, a reflector disposed on the reflective region of the first substrate, wherein a first recess is formed in the transmissive region. A first alignment layer is conformably disposed on the first substrate covering the reflector, wherein a second recess is formed in the transmissive region. A second alignment layer fills the second recess, wherein the pre-tilt angles and orientations of the liquid crystal molecules on the first alignment layer and on the second alignment layer are different.

According to another embodiment of the invention, a method for fabricating a transflective liquid crystal display device is provided. A first substrate includes a reflective region and a transmissive region. A reflector is formed on the reflective region of the first substrate, wherein a first recess is formed in the transmissive region. A first alignment layer is conformably formed on the first substrate, wherein a second recess is formed at the transmissive region. A second alignment layer is formed on the first alignment layer and filling the second recess. A second substrate and the first substrate are assembled with a gap therebetween. A liquid crystal layer is filled between the first and the second substrates, wherein the pre-tilt angles and orientations of the liquid crystal molecules on the first alignment layer and on the second alignment layer are different.

According to another embodiment of the invention, a method for fabricating a liquid crystal display device is provided. A first substrate includes a reflective region and a transmissive region. A reflector and a wall structure thereon are simultaneously formed on the reflective region of the first substrate, wherein a first recess is formed at the transmissive region. A first alignment layer is formed in the first recess, and a second alignment layer is simultaneously formed on the reflector. A second substrate and the first substrate are assembled with a gap therebetween. A liquid crystal layer is filled between the first and the second substrates, wherein the pre-tilt angles and orientations of the liquid crystal molecules on the first alignment layer and on the second alignment layer are different.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention is directed to a single gap transflective LCD device in which balanced brightness and contrast ratio are exhibited in both the transmissive and reflective regions. Since a substantial recess is created on the transmissive region due to the reflector disposed on the reflective region, a first and a second alignment layers are respectively applied on the transmissive and the reflective regions, or alternatively two different alignment materials are simultaneously inkjet printed on the transmissive and the reflective regions. The invention provides a single gap transflective LC cell including T and R regions with similar retardation changes that provide both regions with high light modulation efficiency, thus use of photolithography to create different alignment layers is unnecessary.

Figure 1:
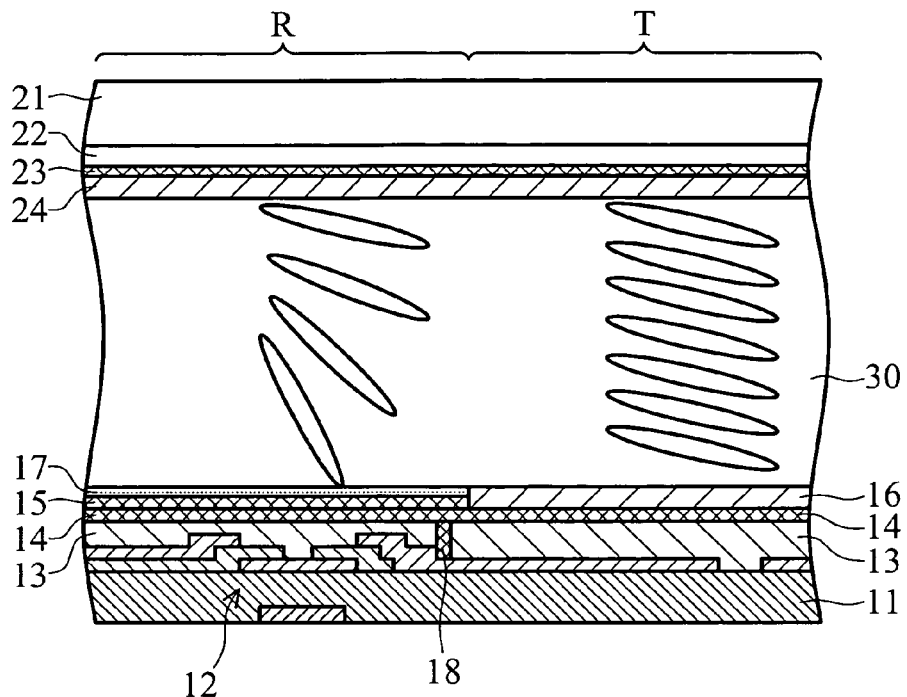
FIG. 1 is a cross section of a conventional transflective LCD device with different alignment layer on the reflective and the transmissive regions respectively.
Figure 2:
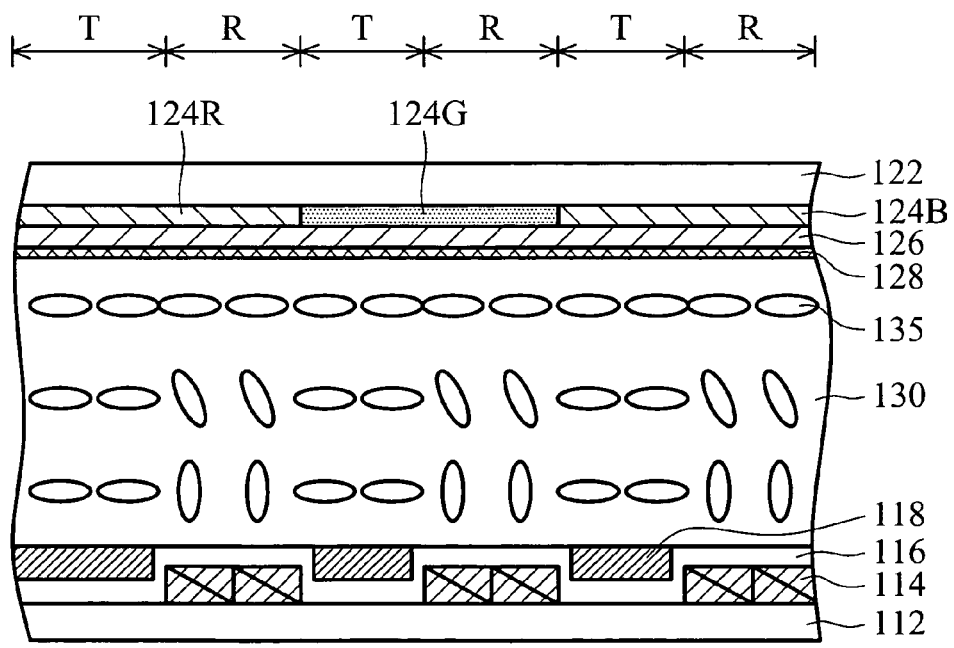
FIG. 2 is a cross section of a transflective LCD device according to an embodiment.

FIG. 2 is a cross section of an exemplary embodiment of a transflective LCD device 100. A step between the transmissive and the reflective regions is substantially a recess. Different alignment materials are applied respectively on the transmissive and the reflective regions, thereby forming similar retardation changes that provide both regions under a single gap transflective LC cell.

Referring to FIG. 2, a lower substrate 112 such as an active matrix substrate is provided. The lower substrate 112 can be divided into a plurality of pixels. Each pixel includes a transmissive region T and a reflective region R. A reflector structure 114 is formed on the reflective region R of the lower substrate 112. The reflector structure 114 comprises a transparent protrusion and a reflective electrode thereon. Since a step between the reflector structure 114 on the reflective region R and the transmissive region T creates a recess on the transmissive region T. A first alignment layer 116 is conformably formed on the lower substrate 112. A second alignment layer 118 is filled in the recess, wherein the pre-tilt angles and orientations of the liquid crystal molecules 135 on the first alignment layer and on the second alignment layer are different.

An upper substrate 122 such a glass substrate or a plastic substrate with color filters 124R, 124G, and 124B thereon is disposed opposing the lower substrate 112 with a gap therebetween. A transparent electrode 126 is formed on the color filters 124R, 124G, and 124B. An alignment layer 128 such as a horizontal alignment layer is disposed on the transparent electrode 126. A liquid crystal layer 130 is interposed between the upper substrate 122 and the lower substrate 112.

Figure 3:
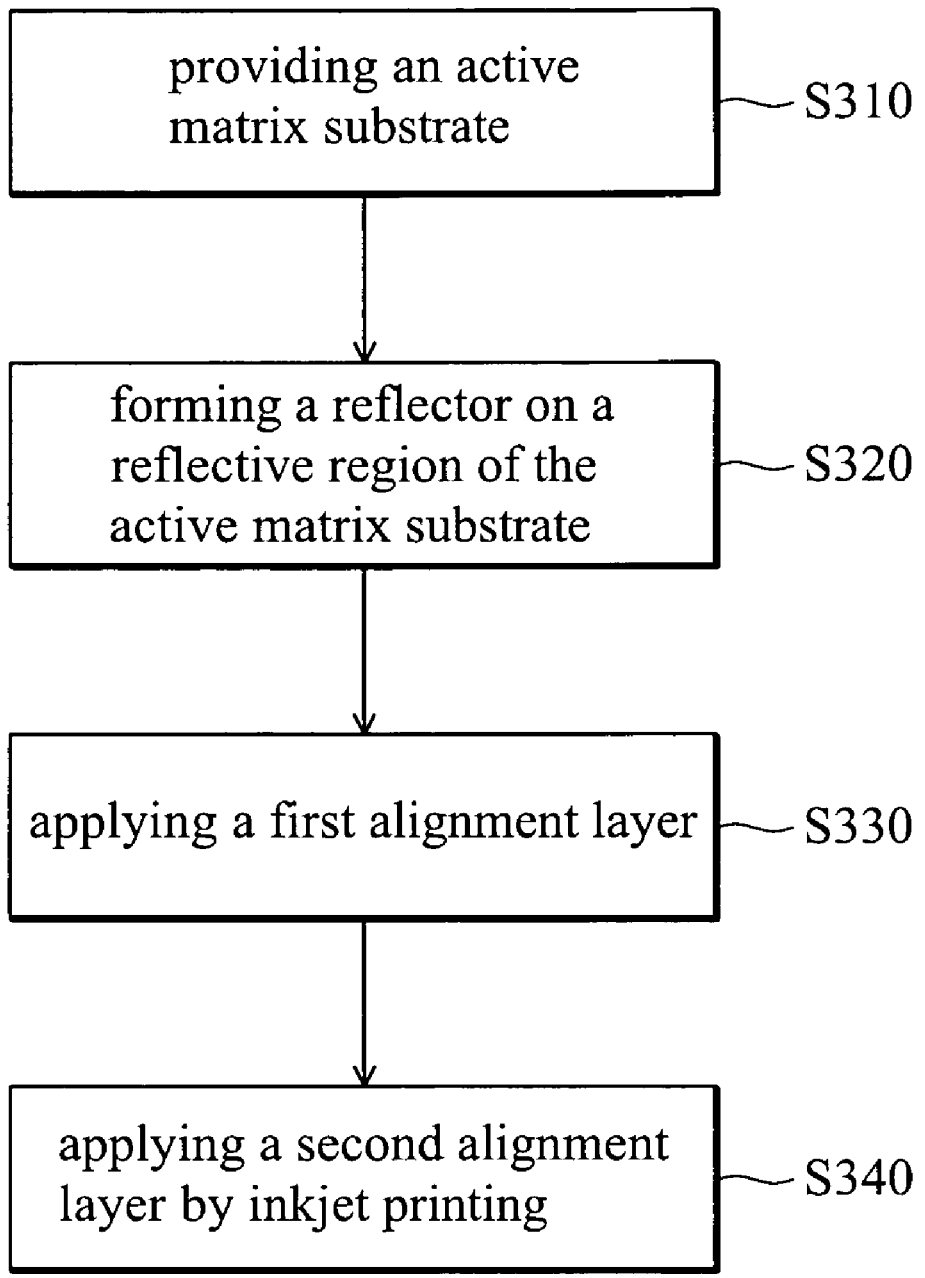
FIG. 3 is flowchart showing the steps of fabricating a transflective LCD device according to an embodiment of the invention.

FIG. 3 is fabrication flowchart of a transflective LCD device according to an embodiment of the invention. In step S310, a first substrate is provided. The first substrate can be an active matrix substrate with a plurality of pixels. Each pixel includes a transmissive region and a reflective region. In step S320, a reflector structure including a reflective electrode is formed on the reflective region of the first substrate. A recess is created on the transmissive region. In step S330, a first alignment layer is conformably formed on the first substrate. In step S340, a second alignment layer is inkjet printed on the transmissive region T of the first alignment layer and fills the recess.

Next, a second substrate such as a color filter substrate is assembled opposing the first substrate with a gap therebetween. A liquid crystal later is interposed between the first and the second substrates.

Figure 4A:
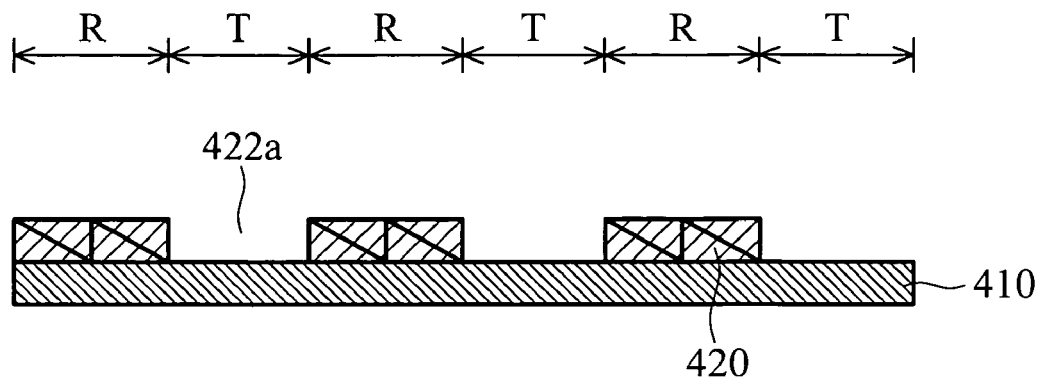
FIGS. 4A-4C are cross sections showing fabrication steps for a substrate structure of a transflective LCD device according to an embodiment of the invention.
Figure 4B:
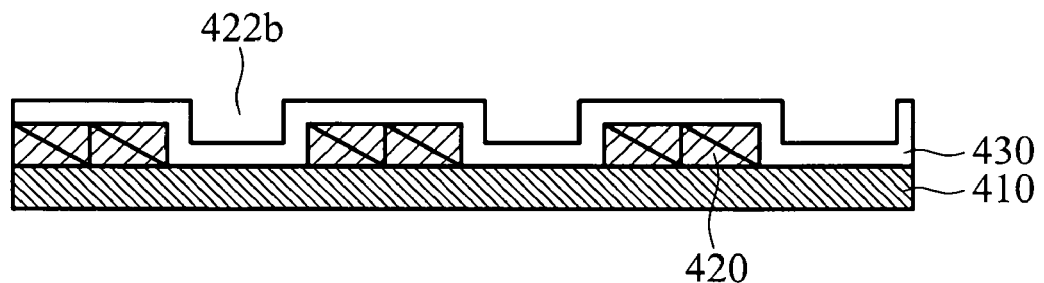
Figure 4C:
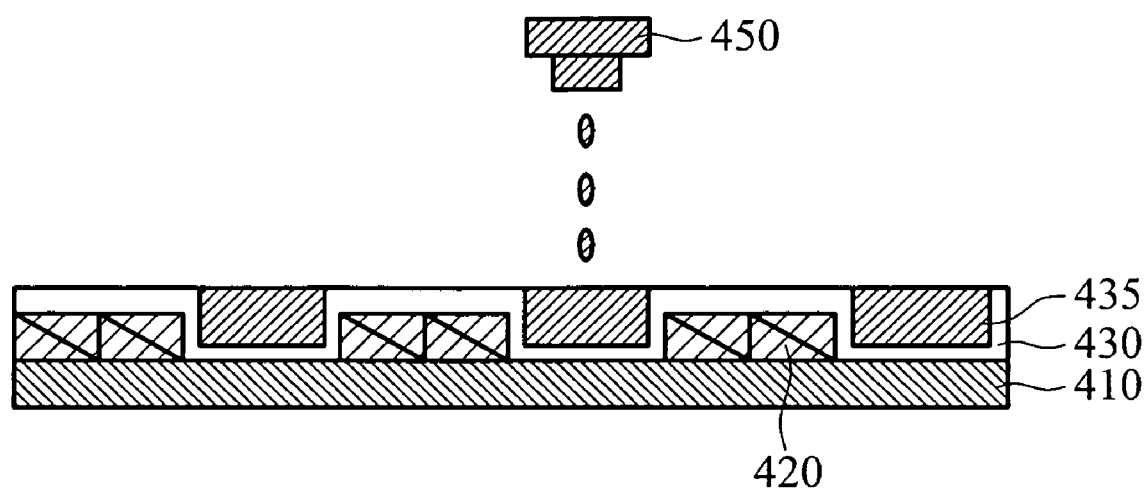

FIGS. 4A-4C are cross sections showing fabrication steps for a substrate structure of a transflective LCD device according to an embodiment of the invention. Referring to FIG. 4A, a first substrate 410 such as a glass substrate, or a transparent plastic substrate is provided. The first substrate 410 can be an active matrix substrate with a plurality of pixels. Each pixel includes a transmissive region T and a reflective region R. A reflector structure 420 is formed on the reflective region R of the first substrate 410. A recess 422a is created on the transmissive region T.

Referring FIG. 4B, a first alignment layer 430 is conformably formed on the first substrate 410 and a recess 422b is formed on the transmissive region T. After the first alignment layer is formed on the first substrate, a soft baking procedure and a hard baking procedure are performed on the first alignment layer. For example, the first alignment layer 430 can be formed by roller coating, spin coating, spraying, or inkjet printing on the first substrate 410. The material of the first alignment layer preferably comprises polyvinyl alcohol (PVA), polyimide (PI), polyamide (PA), polyurea (PU), nylon, or lecithin.

Referring to FIG. 4C, a second alignment layer 435 is formed on the transmissive region T of the first alignment layer 430 and fills the recess 422b. After the second alignment layer 435 is formed on the first alignment layer 430, a soft baking procedure and a hard baking procedure are performed on the second alignment layer 435. For example, the second alignment layer 435 is formed by spraying or inkjet printing on the first alignment layer 430 and fills the recess 422b. More specifically, a polyimide (PI) layer is formed by inkjet printing on the recess 422b of the first alignment layer. A fluid injector 450, such as thermal bubble driven inkjet printhead or piezoelectric diaphragm driven inkjet printhead, injects droplets of alignment material into the recess 422b. The material of the second alignment layer 435 preferably comprises polyvinyl alcohol (PVA), polyimide (PI), polyamide (PA), polyurea (PU), nylon, or lecithin. After baking at 180° C., the first and the second alignment layers are rubbed to provide initial orientation and pre-tilt angle for the liquid crystal molecules.

Next, a second substrate (not shown) such as a color filter substrate is assembled opposing the first substrate 410 with a gap therebetween. A liquid crystal later is interposed between the first and the second substrates, thus fabrication of a transflective LCD device is completed as shown in FIG. 2.

Note that the material of the first alignment layer 430 is selected to have different polarities from the second alignment layer 435. For example, if the first alignment layer 430 is hydrophilic, the second alignment layer 435 is hydrophobic. Therefore, the surface tension of liquid crystal molecules on the first alignment layer 430 is substantially different from that on the second alignment layer 435.

Accordingly, the first alignment layer 430 preferably provides a vertical liquid crystal molecule orientation, i.e., a longitudinal axis of the liquid crystal molecule is pre-tilted 75-90 degrees against the first alignment layer 430, while the second alignment layer 435 provides a horizontal liquid crystal molecule orientation, i.e., a longitudinal axis of the liquid crystal molecule is pre-tilted 0-15 degrees against the second alignment layer 435. Alternatively, the first alignment layer 430 provides a horizontal liquid crystal molecule orientation, i.e., a longitudinal axis of the liquid crystal molecule is pre-tilted 0-15 degrees against the first alignment layer 430, while the second alignment layer 435 provides a vertical liquid crystal molecule orientation, i.e., a longitudinal axis of the liquid crystal molecule is pre-tilted 75-90 degrees against the second alignment layer 435.

Figure 5:
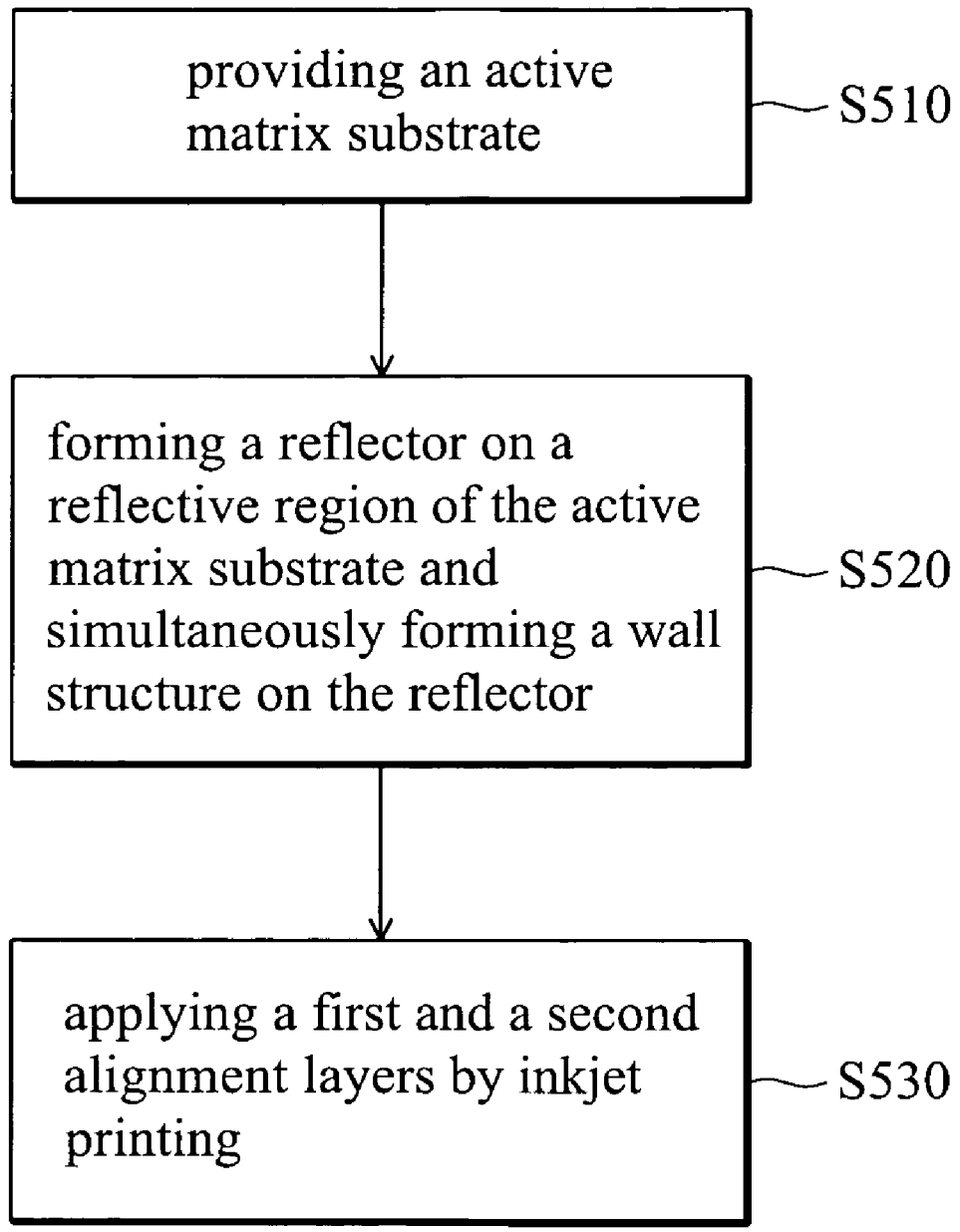
FIG. 5 is flowchart showing the steps of fabricating a transflective LCD device according to another embodiment of the invention.

FIG. 5 is fabrication flowchart of a transflective LCD device according to another embodiment of the invention. In step S510, a first substrate is provided. The first substrate can be an active matrix substrate with a plurality of pixels. Each pixel includes a transmissive region and a reflective region. In step S520, a reflector structure including a reflective electrode is formed on the reflective region of the first substrate, and a wall structure is simultaneously formed on the reflective electrode. Therefore, a first recess is created on the transmissive region, and a second recess is created on the reflective electrode surrounded by the wall structure. In step S530, a first alignment layer and a second alignment layer are simultaneously inkjet printed on the first recess of the transmissive region T and the second recess of the reflective region R.

Next, a second substrate such as a color filter substrate is assembled opposing the first substrate with a gap therebetween. A liquid crystal later is interposed between the first and the second substrates.

Figure 6A:
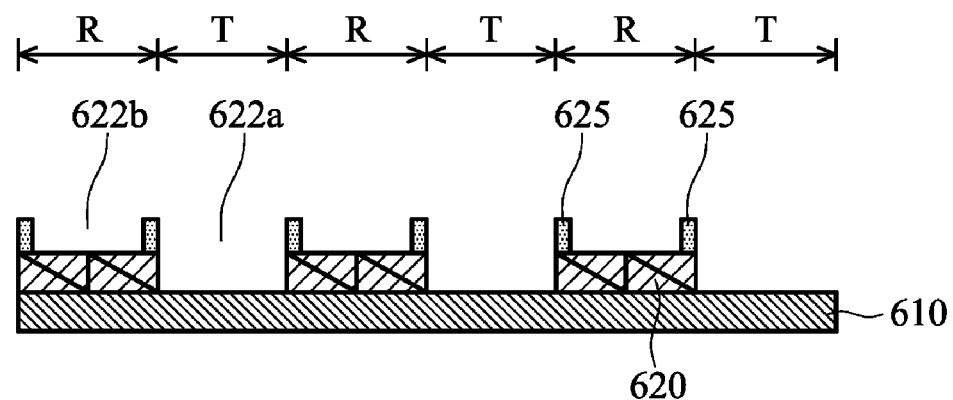
FIGS. 6A-6B are cross sections showing fabrication steps for a substrate structure of a transflective LCD device according to another embodiment of the invention.
Figure 6B:
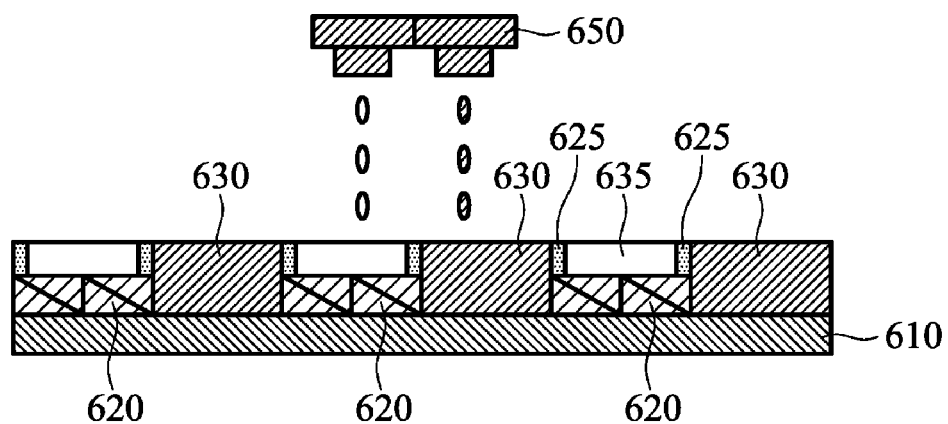

FIGS. 6A-6B are cross sections showing fabrication steps for a substrate structure of a transflective LCD device according to another embodiment of the invention. Referring to FIG. 6A, a first substrate 610 such as a glass substrate, or a transparent plastic substrate is provided. The first substrate 610 can be an active matrix substrate with a plurality of pixels. Each pixel includes a transmissive region T and a reflective region R. A reflector structure 620 including a reflective electrode is formed on the reflective region R of the first substrate 610. A wall structure 625 is simultaneously formed on the reflector structure 620. Therefore, a first recess 622a is created on the transmissive region T, and a second recess 622b is created on the reflector structure 620 surrounded by the wall structure 622b.

Referring FIG. 6B, a first alignment layer 630 and a second alignment layer 635 are simultaneously formed on the first recess 622a and the second recess 622b respectively. A soft baking procedure and a hard baking procedure are sequentially performed on the first alignment layer 630 and the second alignment layer 635. The material of the first and the second alignment layers preferably comprise polyvinyl alcohol (PVA), polyimide (PI), polyamide (PA), polyurea (PU), nylon, or lecithin. For example, the first alignment layer 630 and the second alignment layer 635 are simultaneously formed by spraying or inkjet printing. More specifically, two different alignment materials are respectively formed on the first recess 622a and the second recess 622b by inkjet printing. A dual-head fluid injector 650, such as thermal bubble driven inkjet printhead or piezoelectric diaphragm driven inkjet printhead, can simultaneously inject droplets of different alignment materials into the first recess 622a and the second recess 622b. After baking at 180° C., the first and the second alignment layers are rubbed to provide initial orientation and pre-tilt angle for the liquid crystal molecules.

Next, a second substrate (not shown) such as a color filter substrate is assembled opposing the first substrate 610 with a gap therebetween. A liquid crystal later is interposed between the first and the second substrates, thus fabrication of a transflective LCD device is completed.

The invention is advantageous in that different alignment layers are respectively formed on the transmissive region and the reflective region of a transflective liquid crystal display device in which alignment orientations of liquid crystal molecules on the first and second alignment layers are different. The invention provides a single gap transflective LC cell including T and R regions with similar retardation changes that provide both regions with high light modulation efficiency, thus use of photolithography to create different alignment layers is unnecessary.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transflective liquid crystal display device, comprising:
a first substrate having a top surface defining a horizontal plane, wherein the substrate comprises a plurality of reflective regions interlaced with a plurality of transmissive regions;
a second substrate opposing the first substrate;
a liquid crystal layer interposed between the first and the second substrates;
a reflector disposed on each of the reflective regions of the first substrate, wherein a first recess is formed in each of the transmissive regions between two adjacent reflectors;
a first alignment layer conformably disposed on the first substrate entirely covering both the reflectors of the reflective regions and the transmissive regions, wherein a second recess is formed in the first alignment layer in each transmissive region; and a second alignment layer formed on the first alignment layer so as to fill in each second recess in the first alignment layer, wherein the second alignment layer is interlaced between the reflective regions;

wherein pre-tilt angles and orientations of liquid crystal molecules on the first alignment layer and on the second alignment layer are different, and wherein a top surfaces of the first and the second alignment layers are on a same horizontal level relative to the top surface of the first substrate.

2. The transflective liquid crystal display device as claimed in claim 1, wherein the transflective liquid crystal display device is a single cell gap transflective liquid crystal display device.

3. The transflective liquid crystal display device as claimed in claim 1, wherein a polarity of the first alignment layer is opposite to a polarity of the second alignment layer.

4. The transflective liquid crystal display device as claimed in claim 1, wherein the first alignment layer provides a vertical liquid crystal molecule orientation, wherein a longitudinal axis of the liquid crystal molecule is pre-tilted 75-90 degrees against the first alignment layer; and wherein the second alignment layer provides a horizontal liquid crystal molecule orientation, wherein a longitudinal axis of the liquid crystal molecule is pre-tilted 0-15 degrees against the second alignment layer.

5. The transflective liquid crystal display device as claimed in claim 1, wherein the first alignment layer provides a horizontal liquid crystal molecule orientation, wherein a longitudinal axis of the liquid crystal molecule is pre-tilted 0-15 degrees against the first alignment layer; and wherein the second alignment layer provides a vertical liquid crystal molecule orientation, wherein a longitudinal axis of the liquid crystal molecule is pre-tilted 75-90 degrees against the second alignment layer.

6. A method for fabricating a transflective liquid crystal display device, comprising:

providing a first substrate having a top surface defining a horizontal plane, wherein the substrate comprises a plurality of reflective regions interlaced with a plurality of transmissive regions;

forming a reflector on each of the reflective regions of the first substrate, wherein a first recess is formed in each of the transmissive regions;

conformably forming a first alignment layer entirely covering both the reflectors of the reflective regions and the transmissive regions on the first substrate, wherein a second recess is formed in the first alignment layer in each transmissive region;

forming a second alignment layer formed on the first alignment layer so as to fill in each second recess in the first alignment layer, such that the second alignment layer is interlaced between the reflective regions;

assembling a second substrate opposing the first substrate; and filling a liquid crystal layer between the first and the second substrates;

wherein pre-tilt angles and orientations of liquid crystal molecules on the first alignment layer and on the second alignment layer are different, and wherein top surfaces of the first and the second alignment layers are on a same horizontal level relative to the top surface of the first substrate.

7. The method as claimed in claim 6, wherein a polarity of the first alignment layer is opposite to a polarity of the second alignment layer.

8. The method as claimed in claim 6, wherein the first alignment layer is formed by roller coating, spin coating, spraying, or inkjet printing on the first substrate.

9. The method as claimed in claim 8, after the first alignment layer is formed on the first substrate, further comprising a soft baking procedure and a hard baking procedure.

10. The method as claimed in claim 6, wherein the second alignment layer is formed by spraying, or inkjet printing on the first alignment layer.

11. The method as claimed in claim 6, wherein the first alignment layer provides a vertical liquid crystal molecule orientation and the second alignment layer provides a horizontal liquid crystal molecule orientation.

12. The method as claimed in claim 6, wherein the first alignment layer provides a horizontal liquid crystal molecule orientation and the second alignment layer provides a vertical liquid crystal molecule orientation.

13. A method for fabricating a transflective liquid crystal display device, comprising:

providing a first substrate comprises a plurality of reflective regions interlaced with a plurality of transmissive regions;

forming a reflector with wall structures on each of the reflective regions of the first substrate, wherein a first recess is formed in each of the transmissive regions between two adjacent reflectors, and wherein a second recess is formed above the reflector between two wall structures;

simultaneously forming a first alignment layer in each first recess and forming a second alignment layer in each second recess of each reflector such that the first alignment layer and the second alignment layer are interlaced;

assembling a second substrate opposing the first substrate; and filling a liquid crystal layer between the first and the second substrates;

wherein pre-tilt angles and orientations of liquid crystal molecules on the first alignment layer and on the second alignment layer are different.

14. The method as claimed in claim 13, wherein a polarity of the first alignment layer is opposite to a polarity of the second alignment layer.

15. The method as claimed in claim 13, wherein the step of forming the reflector is simultaneously performed with forming a wall structure on the reflector, whereby a second recess is formed on the reflector enclosed by the wall structure.

16. The method as claimed in claim 15, wherein the second alignment layer is filled in the second recess.

17. The method as claimed in claim 15, wherein the first alignment layer is formed by spraying, or inkjet printing in the first recess.

18. The method as claimed in claim 15, wherein the second alignment layer is formed by spraying, or inkjet printing in the second recess.

19. The method as claimed in claim 13, wherein the first alignment layer provides a vertical liquid crystal molecule orientation and the second alignment layer provides a horizontal liquid crystal molecule orientation.

20. The method as claimed in claim 13, wherein the first alignment layer provides a horizontal liquid crystal molecule orientation and the second alignment layer provides a vertical liquid crystal molecule orientation.

21. A transflective liquid crystal display device, comprising:

a first substrate with a plurality of reflective regions interlaced with a plurality of transmissive regions;

a second substrate opposing the first substrate;

a liquid crystal layer interposed between the first and the second substrates;

a reflector with a wall structures thereon disposed on each of the reflective regions of the first substrate, wherein a first recess is formed in each of the transmissive regions between two adjacent reflectors, and wherein a second recess is formed above the reflector between two wall structures;

a first alignment layer filled in each first recess; and a second alignment layer filled in each second recess;

wherein a pre-tilt angles and an orientations of a liquid crystal molecules on the first alignment layer and on the second alignment layer are different.

22. The transflective liquid crystal display device as claimed in claim 21, wherein the transflective liquid crystal display device is a single cell gap transflective liquid crystal display device.

23. The transflective liquid crystal display device as claimed in claim 21, wherein a polarity of the first alignment layer is opposite to a polarity of the second alignment layer.

24. The transflective liquid crystal display device as claimed in claim 21, wherein the first alignment layer provides a vertical liquid crystal molecule orientation, wherein a longitudinal axis of the liquid crystal molecule is pre-tilted 75-90 degrees against the first alignment layer; and wherein the second alignment layer provides a horizontal liquid crystal molecule orientation, wherein a longitudinal axis of the liquid crystal molecule is pre-tilted 0-15 degrees against the second alignment layer.

25. The transflective liquid crystal display device as claimed in claim 21, wherein the first alignment layer provides a horizontal liquid crystal molecule orientation, wherein a longitudinal axis of the liquid crystal molecule is pre-tilted 0-15 degrees against the first alignment layer; and wherein the second alignment layer provides a vertical liquid crystal molecule orientation, wherein a longitudinal axis of the liquid crystal molecule is pre-tilted 75-90 degrees against the second alignment layer.

* * * * *